US007207050B2

(12) United States Patent
Makino et al.

(10) Patent No.: US 7,207,050 B2
(45) Date of Patent: Apr. 17, 2007

(54) DISK DRIVE PROVIDED WITH TRAY

(75) Inventors: Takeshi Makino, Fukui (JP); Masahiko Nishide, Fukui (JP)

(73) Assignee: Orion Electric Co., Ltd., Fukui (JP)

( * ) Notice: Subject to any disclaimer, the term of this patent is extended or adjusted under 35 U.S.C. 154(b) by 0 days.

(21) Appl. No.: 11/219,771

(22) Filed: Sep. 7, 2005

(65) Prior Publication Data

US 2006/0053427 A1    Mar. 9, 2006

(30) Foreign Application Priority Data

Sep. 8, 2004    (JP)    ............................. 2004-260747

(51) Int. Cl.
*G11B 17/04*    (2006.01)
(52) U.S. Cl. ............................................. 720/613
(58) Field of Classification Search .............. 720/613, 720/601; 360/85, 95; 418/171
See application file for complete search history.

(56) References Cited

U.S. PATENT DOCUMENTS 5,859,744 A * 1/1999 Kim et al. .................... 360/85

5,943,181 A * 8/1999 Son et al. ..................... 360/95
6,893,238 B2 * 5/2005 Eisenmann et al. ......... 418/171
7,076,789 B2 * 7/2006 Yanase et al. ............... 720/601

FOREIGN PATENT DOCUMENTS

JP    2003-100004    4/2003

* cited by examiner

*Primary Examiner*—Tianjie Chen
(74) *Attorney, Agent, or Firm*—Wenderoth, Lind & Ponack, L.L.P.

(57) ABSTRACT

A disk drive with a tray that can be smoothly taken in and out without a gear coming-off from a rack. The tray includes, on its back surface side, a cam wall and a gear escape-preventing wall in parallel to each other along the rack with a predetermined spacing therebetween, and a guide groove provided on a rear side of the tray and connected to the gear escape-preventing wall via an inclined portion formed on the cam wall. Provided on a font side of the tray are a transverse guide groove perpendicular to a disk conveyance track, a transverse guide wall defining the transverse guide groove, a corner wall connected to the cam wall, and a corner escape-preventing wall connected to the gear escape-preventing wall. First and second bosses are provided on a rack loading device, which interpose therebetween the cam wan and the gear escape-preventing wall.

4 Claims, 6 Drawing Sheets

DISK DRIVE PROVIDED WITH TRAY

BACKGROUND OF THE INVENTION

1. Field of the Invention

The present invention relates to a disk drive with a tray, which sets a disk thereon and can be taken out and in from a drive body.

2. Related Art

Generally, many disk drives comprise a tray, and a disk is carried in and out of a drive body by the tray. That is, a disk is set on a tray projecting from a drive body to be carried into the drive body to be placed on a turntable of a traverse unit, and conversely a disk having been placed on the turntable is transferred onto the tray to be carried out.

FIG. 6 shows a conventional disk drive in a state, in which a tray 1 is carried out and put in a disk exchange position. The tray 1 is formed on a top thereof with a circular-shaped, shallow recess, and a disk is fitted into the recess to be set. Provided on a back surface side are a rack 2 extending longitudinally and a substantially L-shaped guide groove 3 along the rack 2. A gear 4 meshes with the rack 2 and a boss 5 projecting from a rack loading device 10 is loosely fitted into the guide groove 3.

The gear 4 is driven by a motor 6 to rotate, and upon rotation of the gear 4, the rack 2 and the tray 1 retreat to be carried into the drive. The tray 1 advances and retreats a predetermined distance to be opened and closed, and the substantially L-shaped guide groove 3 comprises a longitudinal guide groove 7 in parallel to the rack 2, a transverse guide groove 8 perpendicular to the rack 2, and a corner guide groove 9 connecting obliquely between the longitudinal guide groove 7 and the transverse guide groove 8. Also, a rear end of the longitudinal guide groove 7 extends via a curved portion 7a.

In the case where the tray 1 is carried out to advance and move to a disk exchange position, when the boss 5 loosely fitted into the longitudinal guide groove 7 comes to the curved portion 7a, movement of the rack loading device 10 is detected and the tray 1 is stopped. In the case where the tray 1 is carried in to retreat and move to a disk reproduction position, when the boss 5 loosely fitted into the longitudinal guide groove 7 comes to the corner guide groove 9, the rack loading device 10 is likewise moved and the tray 1 is stopped. That is, movement of the boss 5 along the guide groove 3 results in movement of the rack loading device 10 being a body of the boss, and the tray 1 is stopped upon detecting the movement.

JP-A-2003-100004 discloses "Disk recording/reproducing device equipped with tray retractably" that comprises a positioning mechanism preventing inadvertent lateral movement of a slide body, which includes a projecting wall having a first wall provided on an underside of the fray to extend longitudinally and a second wall extending contiguous and perpendicular to the first wall, and at least two projections provided on the slide body to interpose therebetween the second wall in a state, in which the tray has completed advancement, and interpose therebetween the first wall in a state, in which the tray advances or retreats".

In this manner, a construction, in which two rods interpose a continuous wall extending longitudinally instead of a guide groove, is small in an area occupied by constituent parts of a positioning mechanism for a rack loading device, as compared with the case where the boss 5 protrusively provided on the rack loading device is loosely fitted into the guide groove. Also, the provision of two projections (bosses) enhances strength and prevents the projections from breaking even upon application of a shock.

With such conventional construction, however, an external shock in some cases releases the gear and the rack from meshing with each other to make carrying-in and out of a tray impossible. Also, there is caused a problem that because of driving in a state, in which a tip of the gear meshes, the tip can break.

Further, in the case where two projections interpose therebetween a wall serving as a guide as in the disk drive disclosed in JP-A2003-100004, interfacial friction on the wall increases and a moment is generated based on the frictional resistance to tend to change a direction, in which a tray slides. Accordingly, while the tray slides while being guided, it is hard to guarantee a smooth slide. Further, a thin L-shaped wall is lowered in functioning as a reinforcement rib for the tray, as compared with the guide groove 3.

SUMMARY OF THE INVENTION

It is an object of the invention to solve the problems in conventional trays and to provide a disk drive, in which a rack and a tray are not disengaged from meshing, the tray can be smoothly and safely carried in and out, and the tray is not decreased in strength.

Hereupon, a disk drive with a tray according to the invention, comprises a drive body including a traverse unit capable of inclining up and down, a rack loading device arranged in a position opposed to a font end side of the traverse unit to be able to slide in a left and right direction perpendicular to a disk conveyance track, and a tray capable of coming into and out of the drive body, wherein the tray includes on a back surface side thereof, a rack extending longitudinally; a gear to mesh with the rack; a cam wall and a gear escape-preventing wall, which are provided in parallel to each other along the rack with a predetermined spacing therebetween; a guide groove provided on a rear side thereof with being connected to the gear escape-preventing wall and having an inclined portion formed on the cam wall; a transverse guide groove provided on a front side thereof in perpendicular to the disk conveyance track a transverse guide wall defining the transverse guide groove, a corner wall connected to the cam wall, and a corner escape-preventing wall connected to the gear escape-preventing wall. The rack loading device is protrusively provided with a first boss and a second boss, respectively, which interpose therebetween the cam wall and the gear escape-preventing wall.

Preferably, a clearance of ⅔ of a height of a tooth of the gear or less is provided between the gear and the gear escape-preventing wall. With such construction, when the gear tries to escape, it abuts against the gear escape-preventing wall, so that it is possible to keep the gear and the rack in a state of mesh of about ⅓ to prevent a situation, in which mutual tips mesh with each other only slightly and break. Also, preferably, the first boss has a circular-shaped cross section and the second boss has a substantially elliptic-shaped cross section.

According to the disk drive with a tray of the invention, two bosses, that is, the first boss and the second boss interpose therebetween the cam wall and the gear escape-preventing wall, so that the rack loading device can be property positioned and since the cam wall and the gear escape-preventing wall also function as reinforcement ribs, the rack loading device can be positioned in a small space without a decrease of the tray in strength.

Also, the gear escape-preventing wall is provided in parallel to the rack, so that even when the gear ties to escape from the rack, it abuts against the gear escape-preventing wall to be prevented from escaping. By setting a spacing between the gear escape-preventing wall and the gear to ⅔ of the height of a tooth of the gear or less, it is possible to keep the gear and the rack in a state of mesh of about ⅓ to maintain a stable mesh at all times and to prevent breakage of the gear tip.

Further, distances between the cam wall and the gear escape-preventing wall, and the rack are made small whereby a moment generated is small due to interposition of the two bosses even when sliding is accompanied by frictional resistance, so that there is no influence to change a direction, in which the tray slides, and a smooth sliding motion of the tray is guaranteed in taking-in and out of the drive body.

BRIEF DESCRIPTION OF THE DRAWING

FIG. 3 is a plan view fluoroscopically showing the back surface side of the tray put in the course of being carried in;

DETAILED DESCRIPTION OF THE PREFERRED EMBODIMENT

Figure 1:
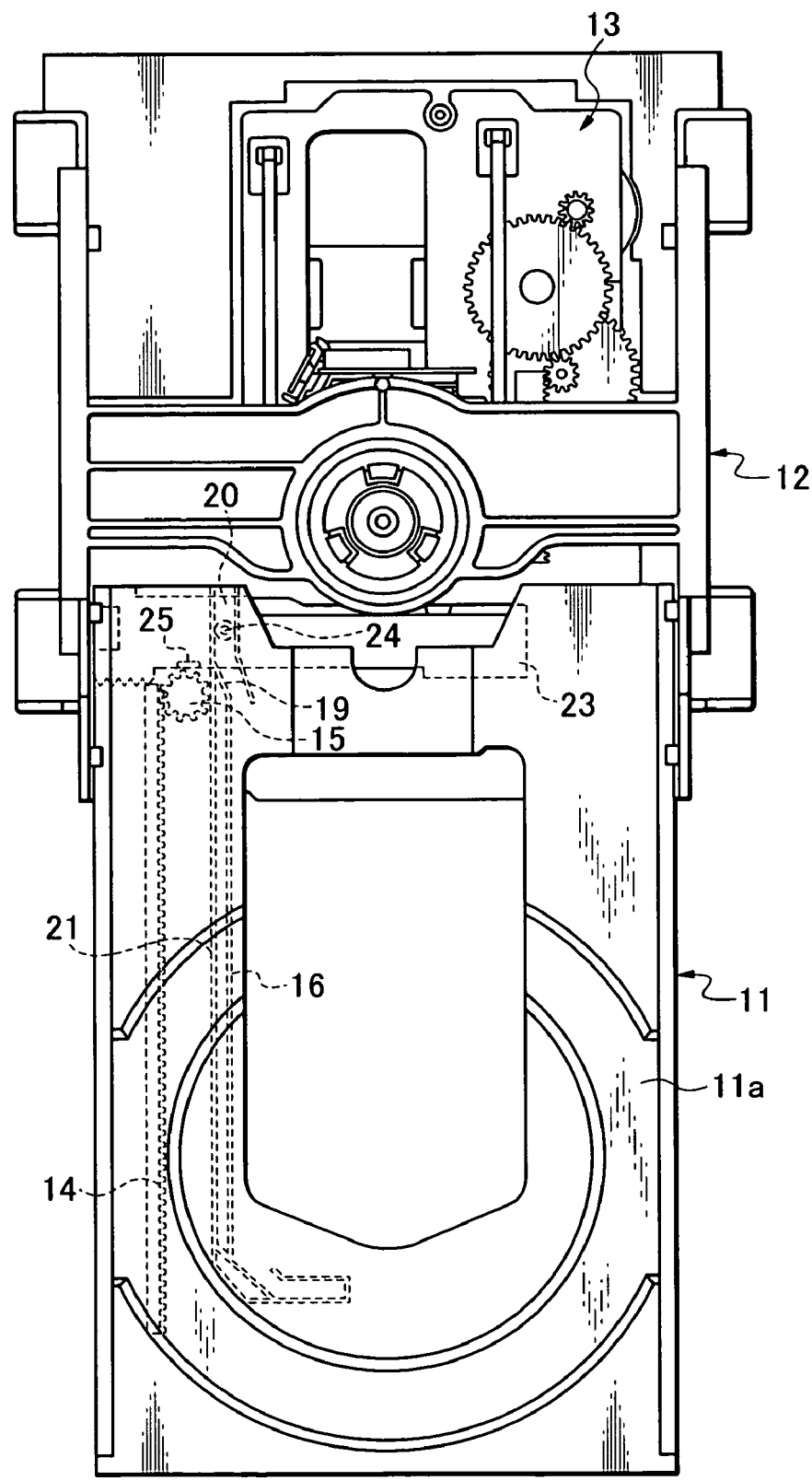
FIG. 1 is a plan view showing a disk drive, according to an embodiment of the invention, with a tray put in a state of being carried out.
Figure 2:
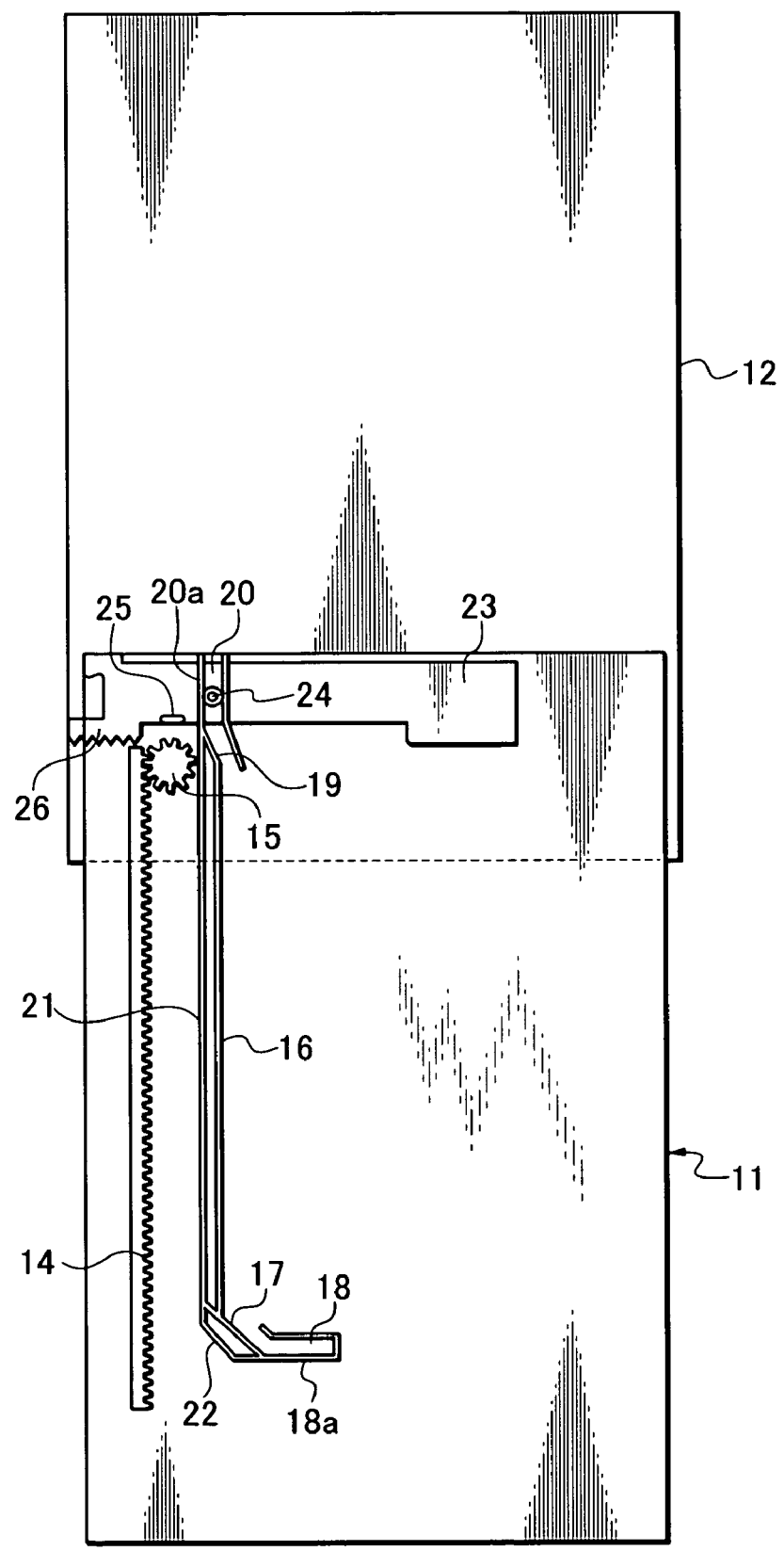
FIG. 2 is a plan view fluoroscopically showing a back surface side of the tray put in a state of being carried out.

A disk drive with a tray according to the invention comprises, as shown in FIG. 1, a tray 11, chassis 12 of the drive body, and a traverse unit 13. The figure shows a state, in which the tray 11 is carried out from the chassis 12 to be put in a disk exchange position, and the tray 11 is formed on a top thereof with a circular-shaped recess 11a, in which a disk is set. Provided on a back surface side of the tray 11 is a rack 14 extending longitudinally, and a gear 15 for meshing with the rack 14.

A cam wall 16 is provided to extend in parallel along the rack 14, a transverse guide groove 18 is formed on a front side of the cam wall 16 to extend perpendicular to the rack 14 via a corner wall 17, which includes an inclined surface therebetween, and a curved guide groove 20 is provided in the rear so as to extend curvedly via an inclined portion 19 therebetween.

A gear escape-preventing wall 21 is provided on a side of the cam wall 16 toward the rack 14 with a predetermined spacing therebetween. A corner escape-preventing wall 22 in parallel to the corner wall 17 is formed on an end of the gear escape-preventing wall 21 on the front and connected to a transverse guide wall 18a that forms the transverse guide groove 18. On the other hand, a rear end of the cam wall 16 defines a straight wall portion 20a of the curved guide groove 20.

Figure 3:
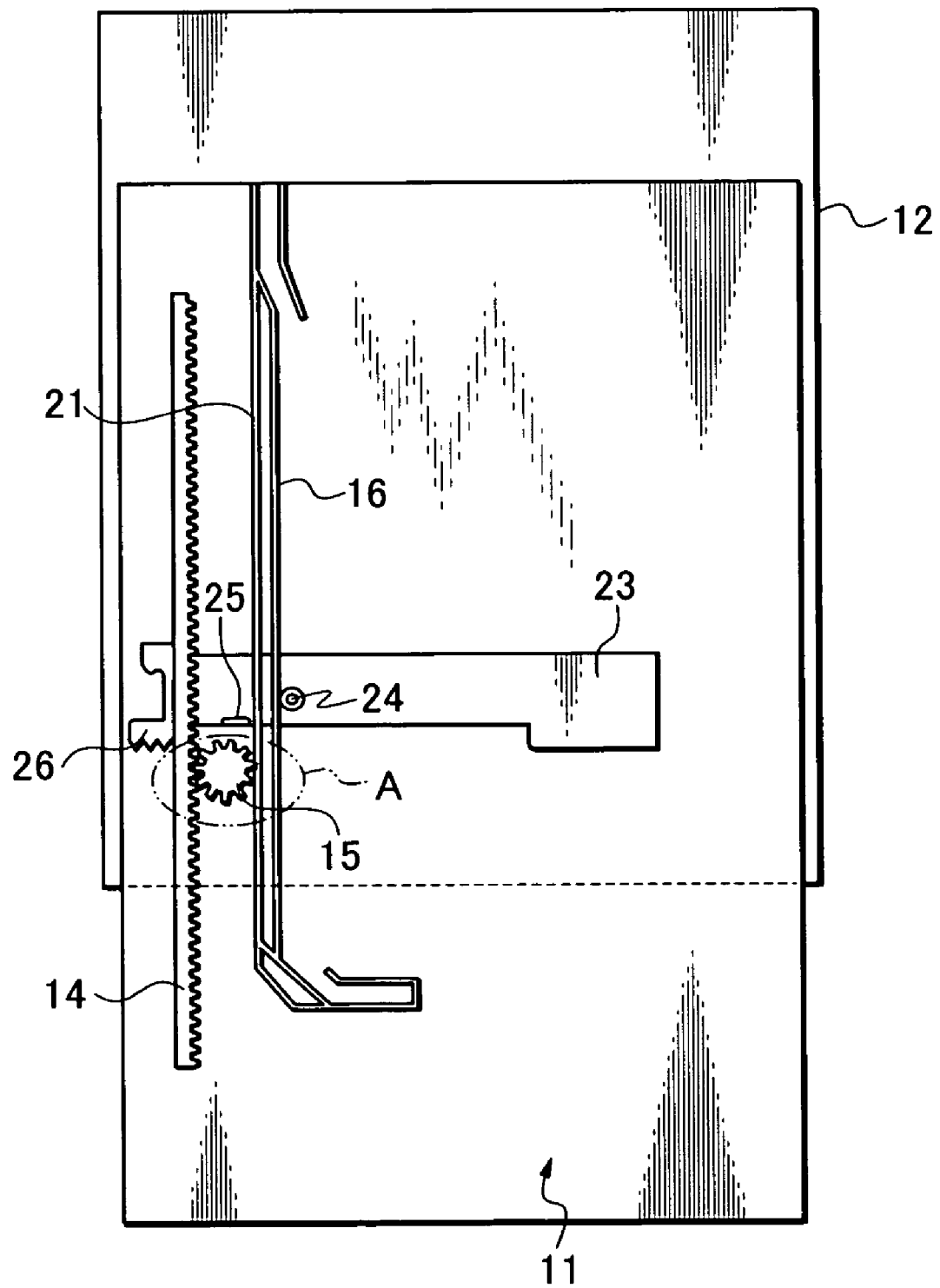

A rack loading device 23 is arranged on the front side of the traverse unit 13 to be slidable in a left and right direction perpendicular to a disk conveyance track. A columnar-shaped first boss 24 and a second boss 25 having a substantially elliptic-shaped cross section are protrusively provided on the rack loading device 23. In a disk exchange position in which the tray 11 is carried out, the first boss 24 is loosely fitted into the guide groove 20, while the rack loading device 23 is positioned on a left end, and the traverse unit 13 is put in a descending state. The second boss 25 is arranged in a position to interpose the cam wall 16 and the gear escape-preventing wall 21. More specifically, a spacing been the first boss 24 and the second boss 25 has a traverse width affording interposing the cam wall 16 and the gear escape-preventing wall 21 (see FIG. 3), an oblique width affording interposing the corner wall 17 and the corner escape-preventing wall 22, and a longitudinal width affording interposing the transverse guide wall 18a (see FIG. 5).

Figure 4:
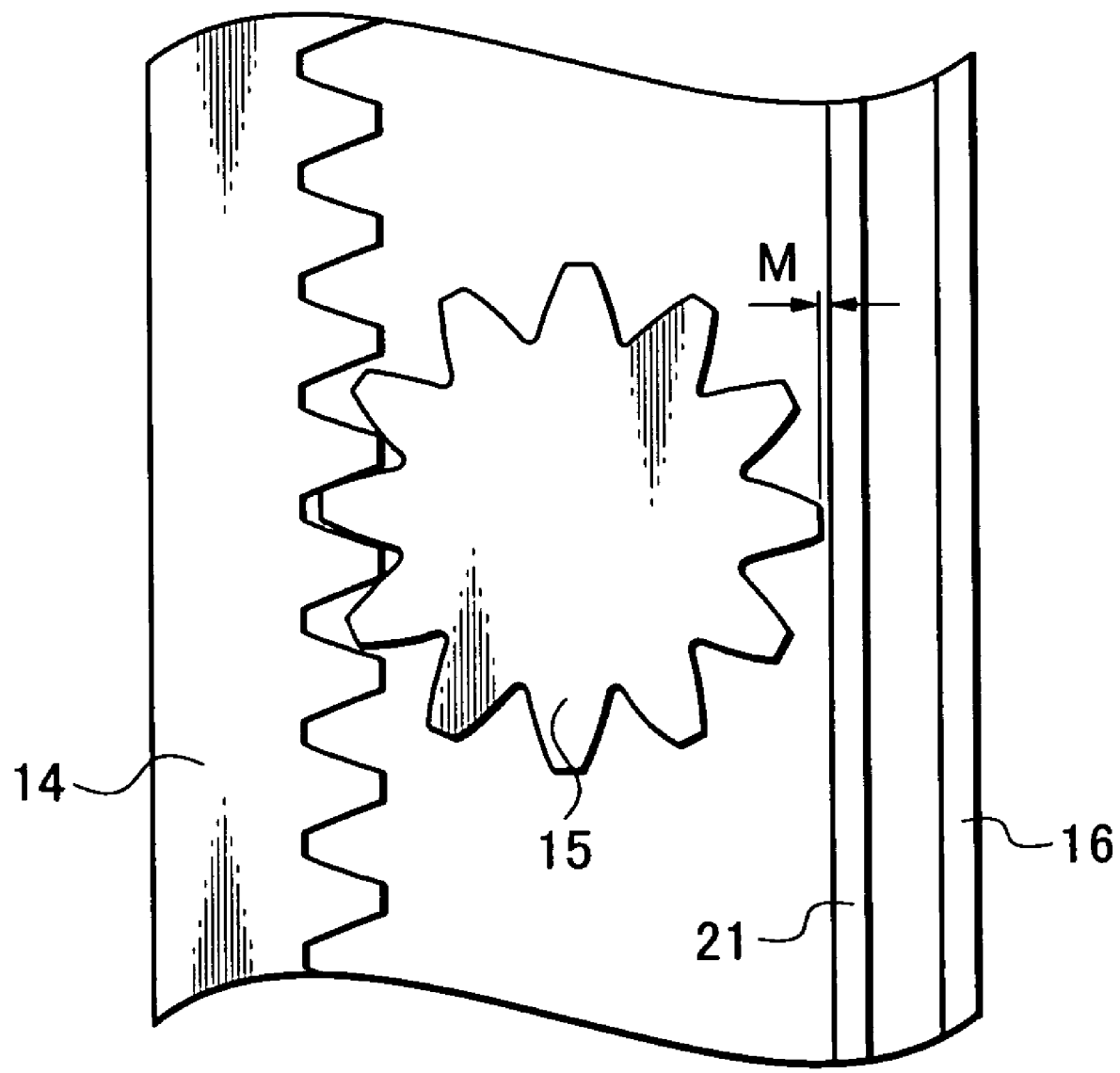
FIG. 4 is an enlarged view of a portion of the back surface side of the tray indicated by A in FIG. 3.

The gear 15 meshing with the rack 14 and the gear escape-preventing wall 21 are arranged to leave a slight clearance M therebetween as shown in enlarged scale in FIG. 4. While the clearance M is not specifically limited in magnitude, it must maintain a state of meshing with the rack 14 in the case where the gear 15 retreats (escapes rightward) to abut against the gear escape-preventing wall 21. On the other hand, since there is a high possibility that when the gear 15 and the rack 14 mesh with each other only slightly at the tips thereof, the tips can break, and in order to prevent this, it is preferable to maintain a state of mesh of about ⅓. Hereupon, the clearance M is set to about ⅔ of the tooth height or less.

With the disk drive constructed in the above manner, a disk is set in the circular-shaped recess 11a of the tray 11 carried out, and when the tray 11 is pushed slightly by hand, the tray 11 retreats and the first boss 24 abuts against the inclined portion 19 of the curved guide groove 20, so that the first boss 24 and the rack loading device 23 move rightward and the gear 15 meshes with the rack 14 when a motor is turned ON. Simultaneously, the second boss 25 projecting from the rack loading device 23 approaches the gear escape-preventing wall 21. Then the gear 15 meshed with the rack 14 is driven by the motor to rotate whereby the tray 11 retreats in a sliding manner, the first boss 24 separates from the guide groove 20 and moves along the cam wall 16, and simultaneously the second boss 25 moves in a state of being close to the gear escape-preventing wall 21.

Thus, the cam wall 16 and the gear escape-preventing wall 21 are interposed between the first boss 24 and the second boss 25, and the rack loading device 23 is correctly positioned. Hereupon, the gear escape-preventing wall 21 provided on the tray 11 can slide without contacting with the gear 15. The first boss 24 coming to the corner wall 17 moves rightward along the corner wall 17. Likewise, the second boss 25 moves rightward along the corner escape-preventing wall 22 and hence the rack loading device 23 moves rightward. As a result, the gear 15 meshes with a rack 26 provided on the rack loading device 23, and owning to rotation of the gear 15, the rack 26 and the rack loading device 23 move further rightward, and the first boss 24 comes to a position on a bottom of a tip end of the transverse guide groove 18 (see FIG. 5).

Figure 5:
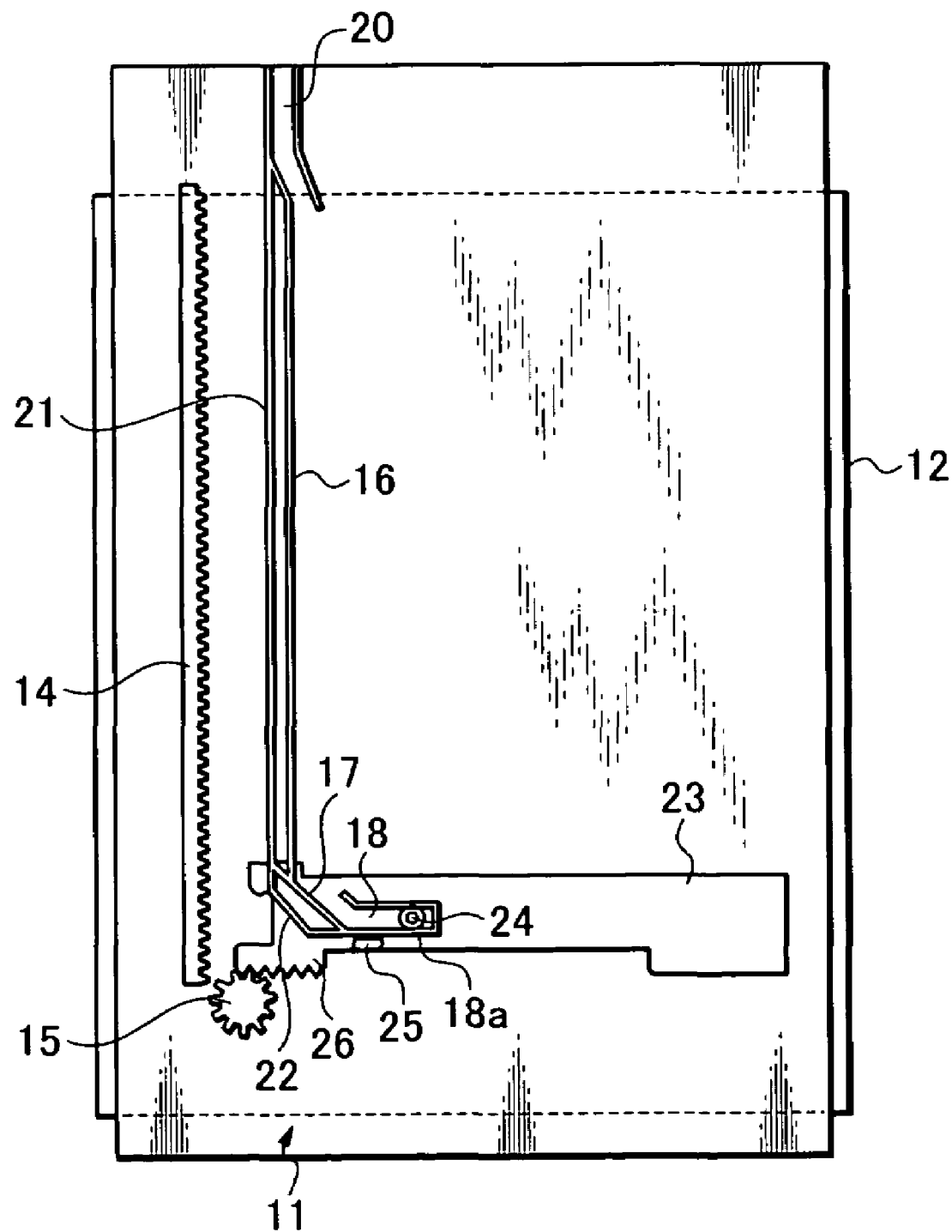
FIG. 5 is a plan view fluoroscopically showing a back surface side of the tray put in a state of being accommodated.
Figure 6:
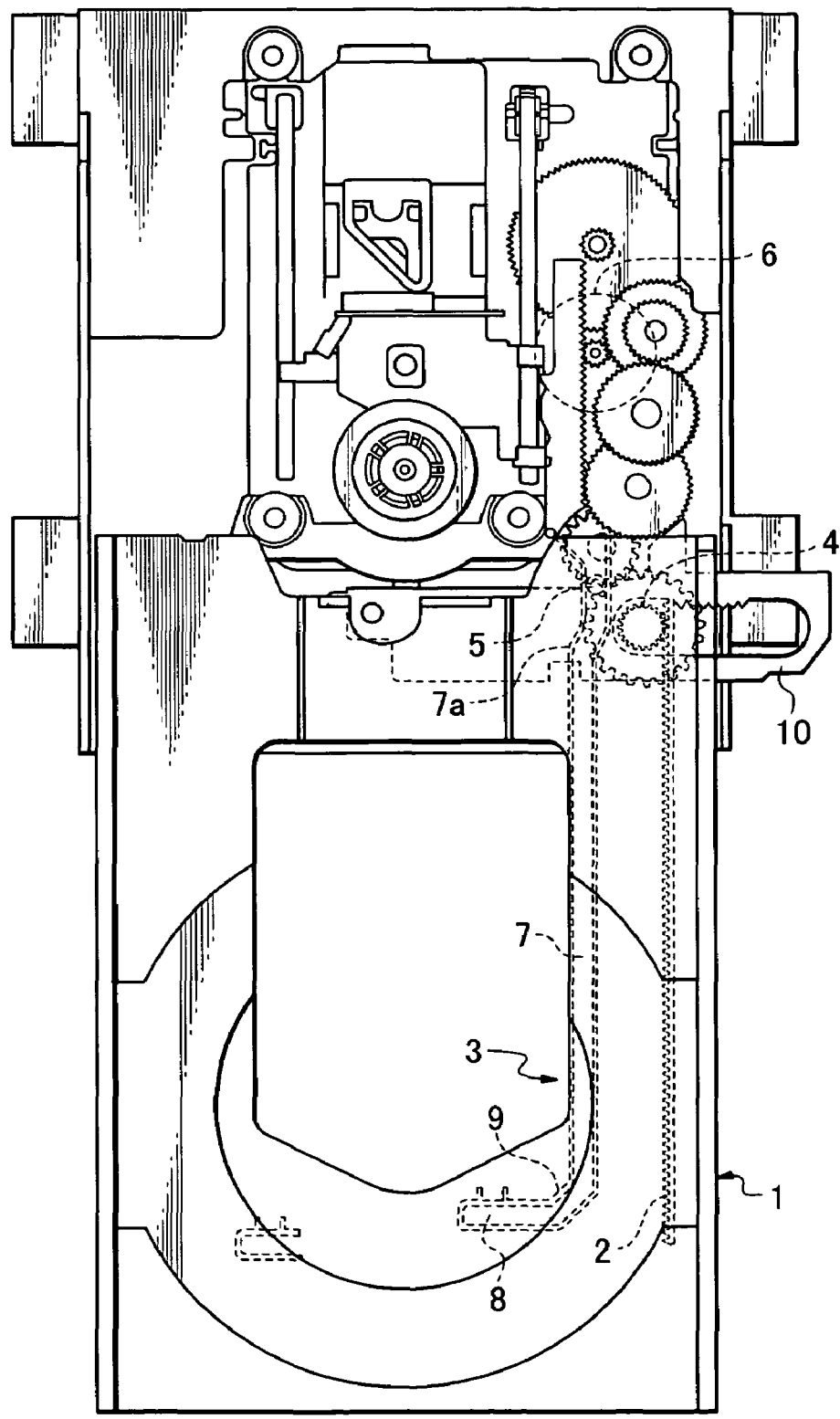
FIG. 6 is a plan view showing a conventional disk drive provided with a tray having a L-shaped guide groove.

When the tray 11 is carried into the chassis as shown in FIG. 5, the traverse unit 13 ascends and a disk is placed on a turntable. Such ascent of the traverse unit 13 is performed by rightward movement of the rack loading device 23, and such movement of the rack loading is performed interlocking with a sliding motion of the tray 11. That is, when the rack loading device 23 has moved and is positioned at a right end, the traverse unit 13 is ascended.

As described above, according to the invention, the rack 14 is provided on one side of the tray 11, and the cam wall 16 and the gear escape-preventing wall 21 are provided with a spacing corresponding to an outside diameter of the gear 15, so that the tray 11 can slide straight with the both sides thereof being guided. While the first boss 24 and the second boss 25 may come into contact with the cam wall 16 and the gear escape-preventing wall 21 at this time, the spacing between the rack 14 and the cam wall 16 and the gear escape-preventing wall 21 is made to a necessary minimum to restrict interfacial friction, so that a moment as generated is small and the tray 11 can slide smoothly at all times.

What is claimed is:

1. A disk drive comprising a drive body including a traverse unit, a rack loading device arranged in a position opposed to a front end side of the traverse unit so as to be able to slide in left and right directions perpendicular to a disk conveyance track, and a tray capable of moving into and out of the drive body, wherein said drive body further includes on a back surface side of the tray:

a rack extending longitudinally to mesh with a pinion gear;

a gear escape-preventing wall extending in parallel to the rack so that the pinion gear is movable between the rack and the gear escape-preventing wall;

a cam wall extending in parallel to the gear escape-preventing wall with a predetermined spacing therebetween, the cam wall having an inclined portion connected to the gear escape-preventing wall at a rear side thereof;

a guide groove defined in part by and extending along a rear end portion of the gear escape-preventing wall and the inclined portion of the cam wall;

a transverse guide wall provided on a front side of the tray and extending in perpendicular to the disk conveyance track, the transverse guide wall being connected to said cam wall via a corner wall; and a transverse guide groove defined in part by and extending along said corner wall and said transverse guide wall, the transverse guide wall also being connected to said gear escape-preventing wall via a corner escape-preventing wall, wherein the rack loading device is provided with a first boss and a second boss protruding therefrom so that the cam wall and the gear escape-preventing wall are interposed between the first and second bosses.

2. The disk drive according to claim 1, wherein a clearance of $2/3$ of the tooth height of the pinion gear or less is provided between the pinion gear and the gear escape-preventing wall.

3. The disk drive according to claim 1, wherein the first boss has a circular-shaped cross section and the second boss has a substantially elliptic-shaped cross section.

4. The disk drive according to claim 2, wherein the first boss has a circular-shaped cross section and the second boss has a substantially elliptic-shaped cross section.

* * * * *